No. 801,983. PATENTED OCT. 17, 1905.
O. J. HUBBARD.
BALE TYING APPARATUS.
APPLICATION FILED DEC. 16, 1904.
5 SHEETS—SHEET 1.
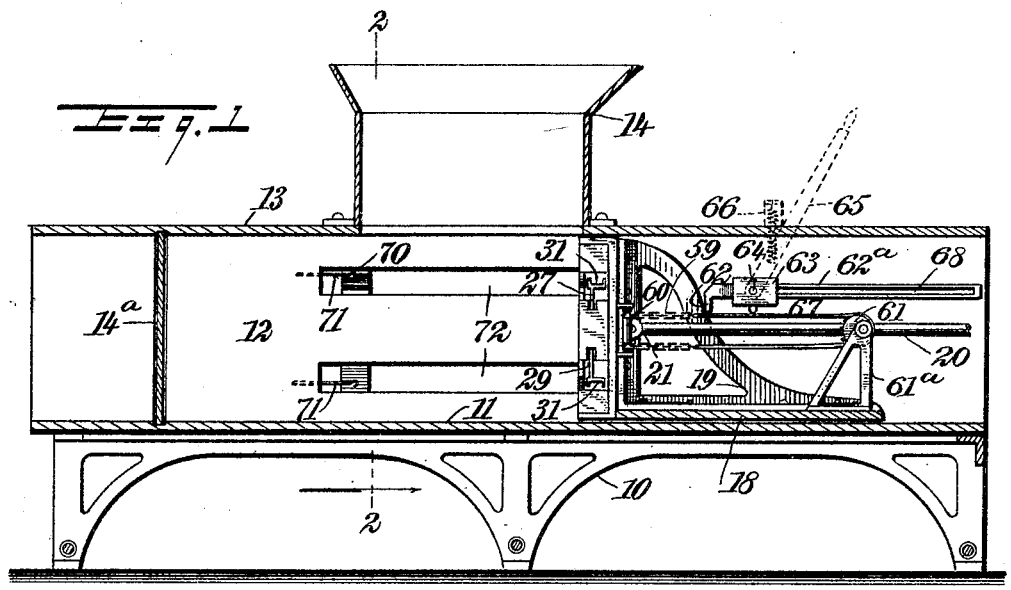
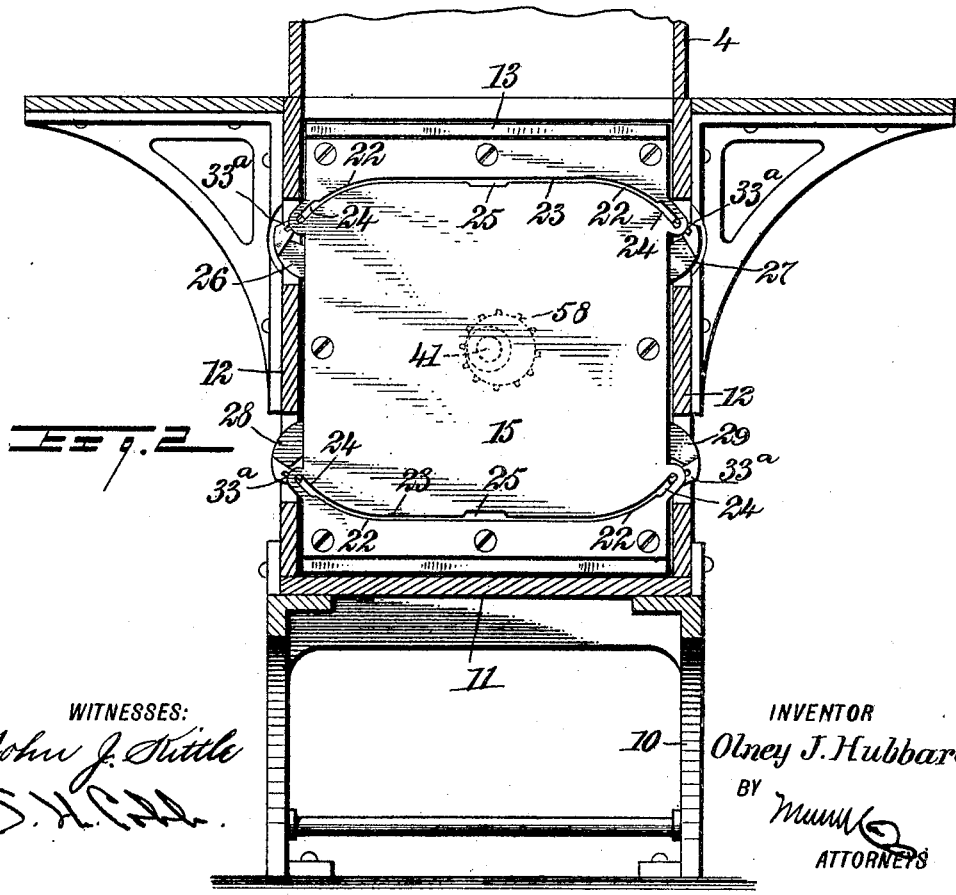
WITNESSES:
John J. Kittle
S. H. Cobb
INVENTOR
Olney J. Hubbard
BY Munn
ATTORNEYS

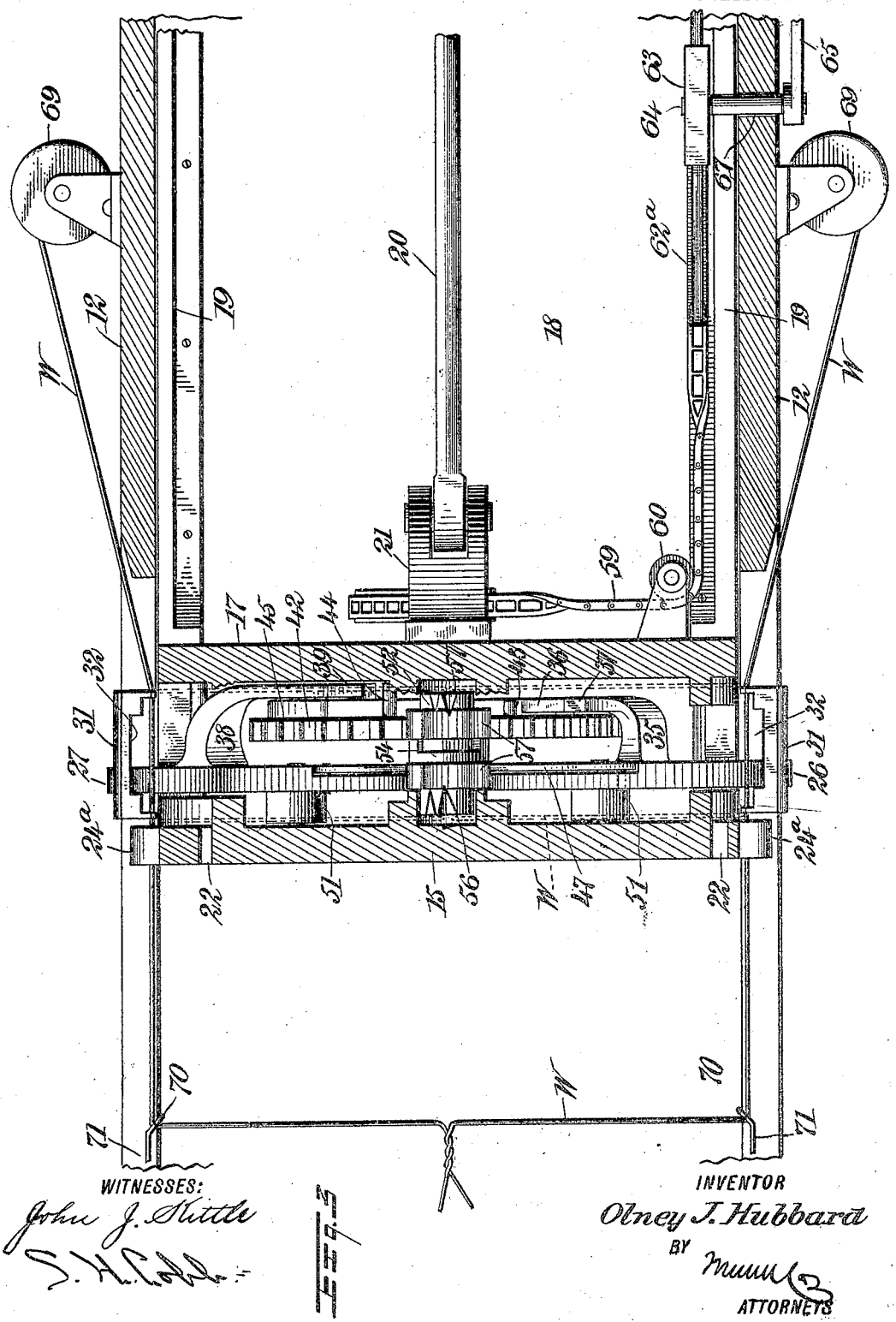

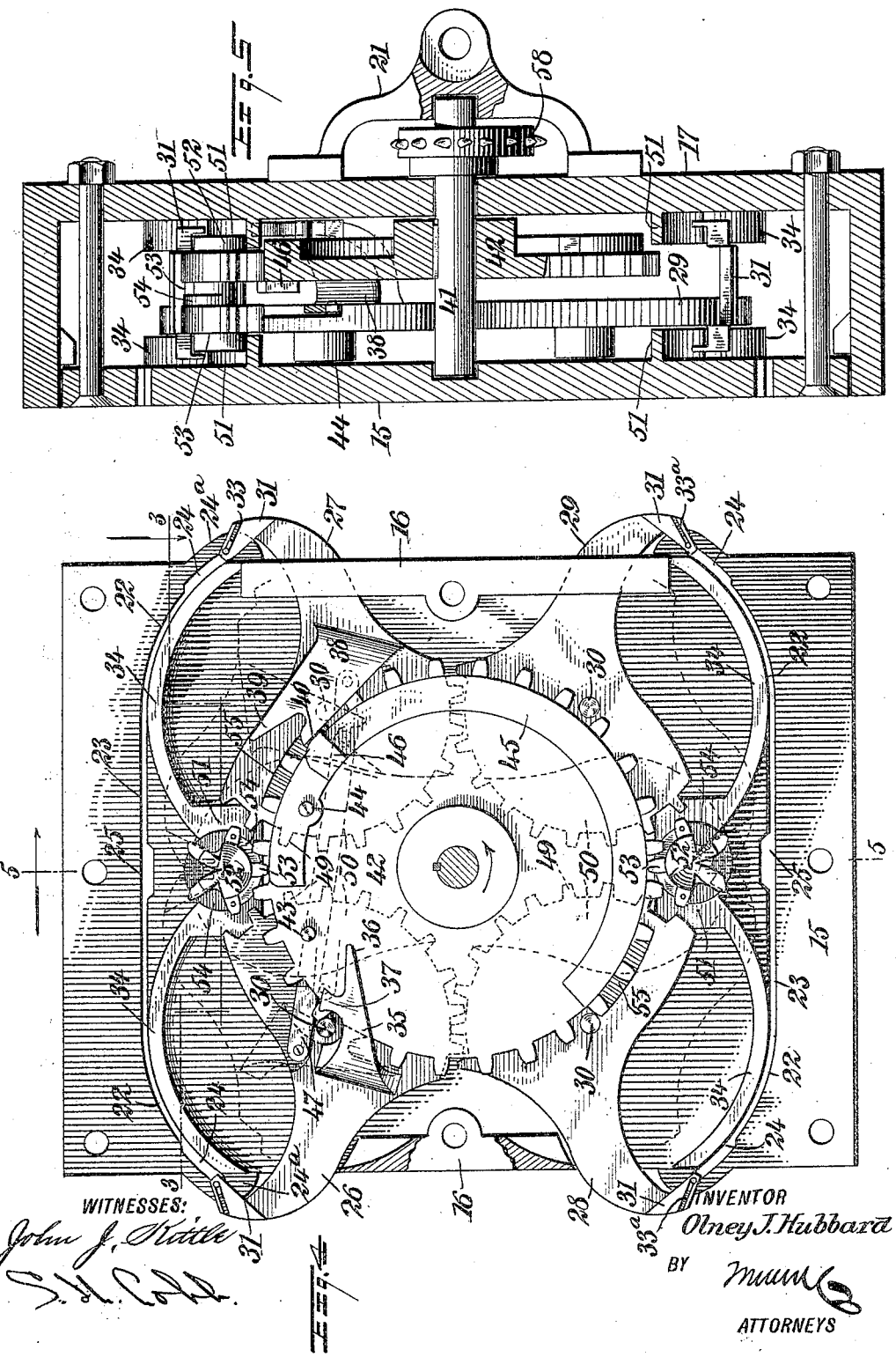

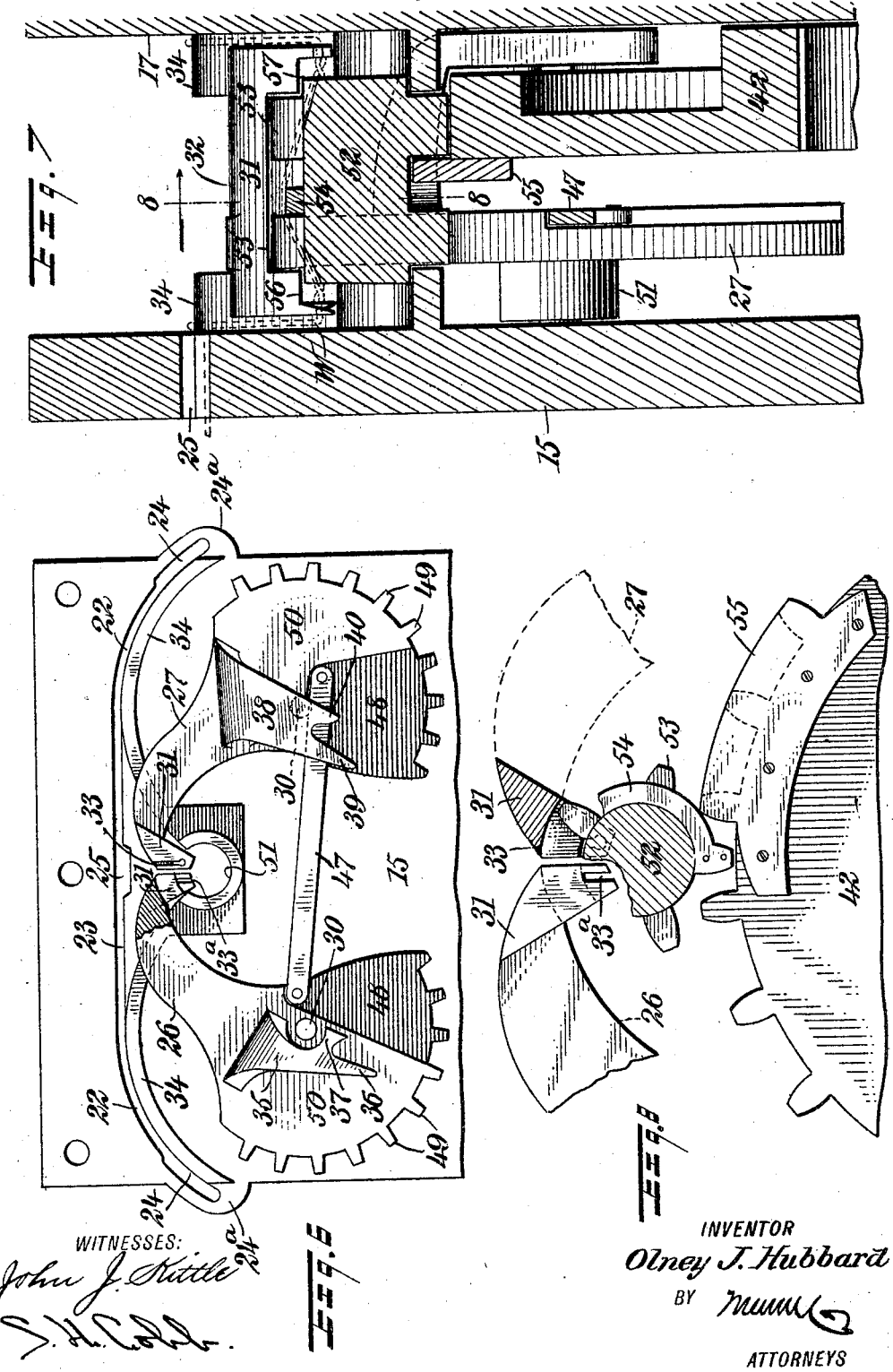

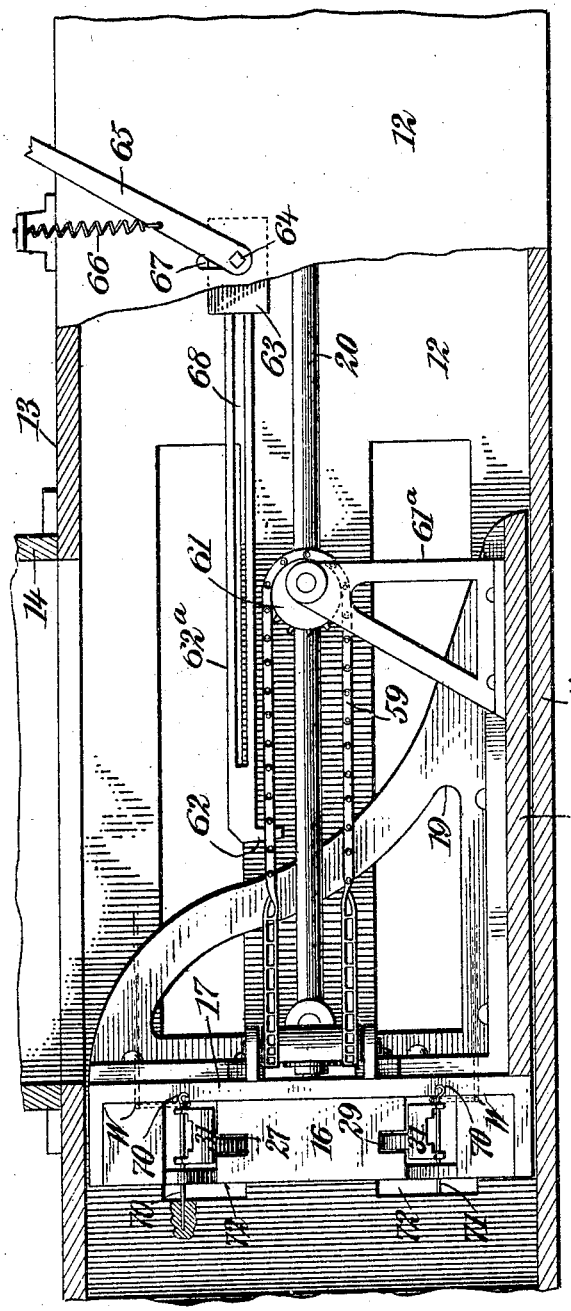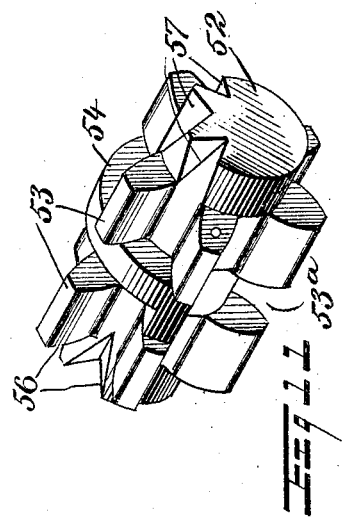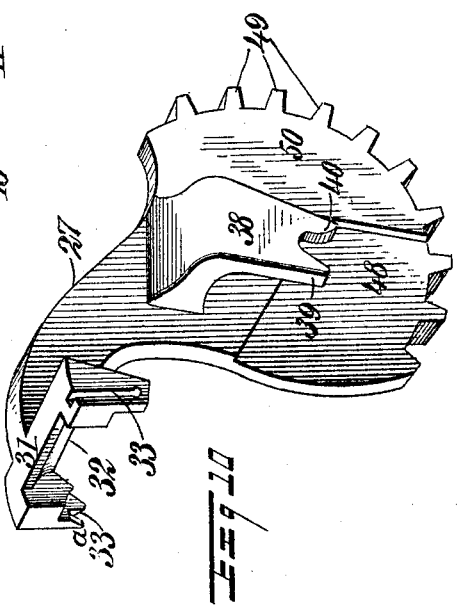

UNITED STATES PATENT OFFICE.

OLNEY JAMES HUBBARD, OF SCOTTVILLE, MICHIGAN.

BALE-TYING APPARATUS.

No. 801,983.     Specification of Letters Patent.     Patented Oct. 17, 1905.

Application filed December 16, 1904. Serial No. 237,110.

*To all whom it may concern:*

Be it known that I, OLNEY JAMES HUBBARD, a citizen of the United States, and a resident of Scottville, in the county of Mason and State of Michigan, have invented a new and Improved Bale-Tying Apparatus, of which the following is a full, clear, and exact description.

My invention relates to bale-tying apparatus, and is especially applicable to hay-presses. Its principal objects are to provide an efficient mechanism of this character operating as a portion of the press by which the bale is formed.

Reference is to be had to the accompanying drawings, forming a part of this specification, in which similar characters of reference indicate corresponding parts in all the views.

Figure 1 is a vertical longitudinal section taken just inside the outer wall of a press to which one form of my invention is applied. Fig. 2 is a vertical transverse section thereof on the line 2 2 of Fig. 1. Fig. 3 is a broken horizontal section taken in a plane just below the cover-plate of the press on the line 3 3 of Fig. 4. Fig. 4 shows in elevation the inner side of the front plate of the plunger with the mechanism carried thereby. Fig. 5 is a vertical section on the line 5 5 of Fig. 4. Fig. 6 is a view showing the upper portion of the construction shown in Fig. 4 with certain of the elements removed and the transferring-arms in their inner or active position. Fig. 7 is an enlarged section taken in the same plane as Fig. 5, with the twisting-wheel also in section. Fig. 8 is a section on the line 8 8 of Fig. 7 and illustrates the relation between the transferring-arms, twisting-wheel, and actuating member. Fig. 9 is an enlarged broken section similar to Fig. 1, but with the plunger in its extreme outward position. Fig. 10 is a perspective view of one of the transferring-arms, and Fig. 11 is a similar view of one of the twisting-wheels.

10 designates a supporting-frame of such an apparatus as a hay-press, which carries a bottom plate 11, side walls 12 12, and a cover-plate 13, these forming a chamber by which the material is received for compression, this being delivered through an opening in the cover-plate by means of a suitable hopper 14. In the chamber beyond the hopper at the discharge end of the press is a movable head 14ª. In this chamber operates a plunger comprising a front or contact plate 15, which is carried by side walls 16, extending into coaction with a back plate 17. This back plate has at its lower edge an extension 18, sliding upon the bottom plate of the press, and between the back plate and extension at opposite sides are preferably situated braces 19 19 to strengthen the plunger. Reciprocation is imparted to it by a connecting-rod 20, articulated to a bracket 21, carried by the back plate and operated from any convenient source of power.

In the particular embodiment of my invention here illustrated two tie-wires are to be used, though any other number may be employed, and to receive these wires there are provided near the upper and lower edges of the front plate slots, each of which has curved end portions 22, connected by horizontal portions 23. At each end of each of these slots is an enlargement 24, at least a portion of which lies in a lug 24ª, projecting from the side of the front plate, while near the center is an enlargement 25. Operating in connection with the slots are wire-transferring members or arms 26, 27, 28, and 29, each pivoted at 30 upon the front plate. Each arm is shown as having an operating end 31, which lies substantially at right angles thereto and extends between the plunger-plates. This end is cut away at 32, and in the projections thus formed are situated an alined opening 33 and a slot 33ª, the former being located at the side toward the back plate and having at one side a recess extending outwardly, while the latter is at the opposite side and opens inwardly. The end portions 31 preferably move over and may be guided by pairs of curved walls 34 34, projecting from the front and back plates.

The arm 26 has extending from it at the side toward the back plate an operating member 35, which has an end projection 36 and a lateral projection 37. The arm 27 is provided with a similar member 38, which has a relatively long projection 39 and a shorter projection 40. Each of these operating members is offset from its arm, as is best shown in Figs. 3 and 9. Journaled in the front plate and in the bracket 21 and extending through an opening in the back plate is a shaft 41, carrying within the plunger an actuating member or gear 42. This gear, which lies between the arms 26 and 27 and their operating members, has extending from the side toward the latter a pin or projection 43 and a second pin or projection 44, carried by a raised circumferential portion or rim 45. This rim also has fixed upon it a somewhat extended projection or member 46. The transferring-arms are connected to move together, the upper pair 26 and 27 being shown as joined by a rod or bar 47, operating within recesses 48, while the arm 28 is provided with teeth 49, formed about the edge of a sector-shaped portion 50, these teeth meshing with similar teeth upon the arm 26. The arms 29 and 27 are connected in the same manner.

Journaled in suitable bearings 51 upon the plunger-plates, which are shown as situated between the curved walls 34 34 and open at the top, are rotatable twisting members or wheels 52 52, located in proximity to the meeting-points of the operating ends of the pairs of arms and just inside the enlarged portions 25 of the plate-slots. Each twisting-wheel has about its periphery teeth 53, which are divided into two sections by an annular recess $53^a$, one set of these teeth meshing with the gear 42. In the recess is mounted a cutting-blade 54, extending for a portion of the distance about the wheel, and with these blades coöperate blades 55 55, fixed at the sides of the gear 42. In the top of each wheel at its opposite ends are formed recesses 56 and 57, which are inclined toward the wheel-journals and are of sufficient depth to admit the twisting wire and allow of its being carried through the bearings.

Fast upon the outer end of the shaft 41 is a sprocket-wheel 58, over which passes a chain 59, guided by a roll 60, mounted at one side of the plunger and then passing over an idler 61, journaled upon a standard $61^a$, rising from the plunger extension. Both the wheels 58 and 61 are mounted eccentrically upon their shafts, for a reason which will be hereinafter stated. Coöperating with the chain is a hook 62, shown as formed upon one end of a bar $62^a$, carried by a support 63. This support has projecting from one side a pin 64, which has fastened to it a lever 65. This bar, support, and lever are held normally upward so that the hook lies at a point just above the upper run of the chain by a spring 66, conveniently attached to the lever and to a portion of the press. The support is held against longitudinal movement, while allowed to rise and fall to a limited extent, by a slot 67 in the side wall of the press, through which the pin 64 extends. The bar is allowed to move through the support to a definite extent by a slot 68, which receives the pin.

In using the apparatus the wire W is carried by suitable reels or supports 69, mounted upon the side walls of the press and running therefrom through the opening 33 and slot $33^a$ at the ends of the transferring-arms and then through the slots in the front plate. This wire having been carried outwardly by a previous movement of the press, it is engaged by hooks 70, formed at the ends of extended stems 71, fastened at the outer extremities of slots 72 in the side walls, in which the lugs $24^a$ of the plunger travel. By this operation the wires will have had their ends twisted together, as is illustrated in full lines in Fig. 3 of the drawings, and in this position hay or other material to be baled will be supplied to the chamber through the hopper, and when a sufficient amount has accumulated the plunger is caused to advance to compress the material against the head $14^a$, and at this time an operator drops the hook 62 into a link in the chain by means of the lever. As the plunger travels upward the bar $62^a$ moves through the support until the end of the slot contacts with the pin 64, which occurs when the plunger has approached the end of the stroke, at which time the compression of the material is nearly completed. The contact of the pin with the end of the slot stops the movement of the bar, and consequently of the chain, and this acting upon the sprocket-wheel 58 causes the actuating member 42 to rotate. This brings the pin 43 into coaction with the projection 36, swinging the arm 26 upon its pivot and transferring its wire from the end of the slot in the front plate toward the center. The movement of the arm 26 is communicated to the arm 27 by the bar 47, so that its operating end will advance with its wire in the opposite direction at the same rate, while the lower pair of arms 28 and 29 are similarly moved by the intercurrent teeth 49. When the pin 43 passes out of coaction with the projection 36, the movement is continued by the contact of the end of the circumferential portion 45 with the lateral projection 37. This brings the operating ends of both pairs of arms together, as is particularly shown in Figs. 6 and 8, and into coaction with the twisting-wheels, which receive the wires between their teeth. The arms are then temporarily locked in this position by the projection 37 riding upon the outer edge of the portion 45. The rotation of these wheels twists the wires together, as is indicated in dotted lines in Fig. 7, and when this operation has been completed the central portions of the twisted strands are operated upon by the cutting-blades and severed. (See the dotted position in Fig. 3.) During the cutting operation the actuating member will be rapidly rotated as a result of the eccentric relation of the wheels 58 and 61, while the movement of the transferring-arms to the center will have been comparatively slow. Then the pin 44 will have reached the projection 39 of the arm 27, swinging the arms 26 and 27 in the opposite direction to separate them. The action of the pin is transferred to the portion 46, which strikes the shorter projection 40. The effect of this movement is to drop the portions of the severed wires which are about the completed bale from the slots $33^a$ and to transfer the portions which are to surround the new bale to the outer ends of the slots in the front plate by the arm-openings 33. After the wires have been cut upon the finished bale it may be removed, the ties being withdrawn through the slot enlargements 25. As the plunger reaches its extreme position of outward travel the hooks 70 pass through the end enlargements 24 of the plate-slots, and when the plunger again retreats they retain the twisted ends of the wires and hold them in the proper position to surround a fresh charge of material. Upon this reverse movement of the plunger the pull of the hook upon the chain slackens, enabling the bar to be raised by the supporting-spring. The operation may now be repeated in the same manner.

Having thus described my invention, I claim as new and desire to secure by Letters Patent—

1. The combination with a press having a plunger, of tying mechanism carried by the plunger.

2. The combination with a press having a plunger comprising separated plates, of tying mechanism situated between the plates.

3. The combination with a press having a plunger, of wire-engaging means, and tying mechanism carried by the plunger and operable through the movement of the plunger.

4. The combination with a press having a plunger provided with an opening through which a wire may pass, of tying mechanism carried by the plunger operating in proximity to the opening.

5. A bale-tying mechanism comprising a pair of wire-transferring members having portions movable into proximity with one another, and wire-twisting members operating between the transferring members.

6. A bale-tying mechanism comprising a pair of wire-transferring members having portions movable into proximity with one another, and toothed wire-twisting members operating between the transferring members.

7. A bale-tying mechanism comprising a pair of wire-transferring members having portions movable into proximity with one another, said portions being provided with oppositely-extending slots, and wire-twisting members operating between the transferring members.

8. A bale-tying mechanism comprising a pair of transferring-arms, means for connecting the arms, a rotatable actuating member coöperating with one of the arms to move them toward one another, and twisting means associated with the arms.

9. A bale-tying mechanism comprising a pair of transferring-arms, means for connecting the arms, a rotatable actuating member coöperating with one of the arms to move them toward one another and with the other arm to separate them, and twisting means associated with the arms.

10. A bale-tying mechanism comprising a pair of transferring-arms, means for connecting the arms, a rotatable actuating member coöperating with one of the arms to move them toward one another, means carried by the rotatable member for maintaining the position of the arms, and twisting means associated with the arms.

11. A bale-tying mechanism comprising a pair of transferring-arms, means for connecting the arms to cause them to move together, a rotatable actuating member having a projection coöperating with the arms, and twisting means associated with the arms.

12. A bale-tying mechanism comprising a pair of transferring-arms, means for connecting the arms to cause them to move together, a rotatable actuating member having separated projections coöperating with each of the arms, and twisting means associated with the arms.

13. A bale-tying mechanism comprising transferring-arms, toothed twisting means associated with the arms, a rotatable actuating member having projections coöperating with the arms, and teeth meshing with those of the twisting member.

14. A bale-tying mechanism comprising opposite pairs of coacting transferring-arms, a rotatable actuating member coöperating with one pair of arms, means for connecting the pairs with one another, and twisting means associated with each pair of arms.

15. A bale-tying mechanism comprising opposite pairs of coacting transferring-arms, a rotatable actuating member coöperating with one pair of arms, gearing connecting the pairs with one another, and twisting means associated with each pair of arms.

16. A bale-tying mechanism comprising a rotatable twisting member, a rotatable actuating member therefor, and coöperating cutters carried by the twisting member and actuating member.

17. The combination with a press having a plunger, of transferring-arms pivoted upon the plunger, a rotatable twisting member mounted upon the plunger, and a rotatable actuating member for the arms and twisting member journaled upon the plunger.

18. The combination with a press having a plunger, of transferring-arms pivoted upon the plunger, a rotatable twisting member mounted upon the plunger, a rotatable actuating member for the arms and twisting member journaled upon the plunger, and cutting means carried by the twisting member and actuating member.

19. In a press, the combination with a frame, of a plunger movable thereon, a wire-support mounted upon the frame, and wire-manipulating mechanism carried by the plunger and including twisting means.

20. In a press, the combination with a frame, of a plunger movable thereon, wire-manipulating mechanism carried by the plunger and including twisting means, and wire-engaging means carried by the frame.

21. In a press, the combination with a frame, of a plunger movable thereon, tying mechanism carried by the plunger, gearing for the tying mechanism, and means for actuating the gearing mounted upon the frame.

22. In a press, the combination with a frame, of a plunger movable thereon, tying mechanism carried by the plunger, gearing for the tying mechanism including a chain, and means for holding the chain stationary while the plunger moves.

23. In a press, the combination with a frame, of a plunger movable thereon, tying mechanism carried by the plunger, gearing for the tying mechanism including a chain, a support mounted upon the frame, and a member for coaction with the chain carried by the support.

24. In a press, the combination with a frame, of a plunger movable theron, tying mechanism carried by the plunger, gearing for the tying mechanism including a chain, a support mounted upon the frame, and a member for coaction with the chain carried by the support and which has a limited movement through the support.

In testimony whereof I have signed my name to this specification in the presence of two subscribing witnesses.

OLNEY JAMES HUBBARD.

Witnesses:
LOUDEN S. BOMBERGER,
EDWARD J. EDER.